(12) United States Patent
Do et al.

(10) Patent No.: US 9,871,414 B2
(45) Date of Patent: Jan. 16, 2018

(54) SECURE WIRELESS POWER ACCESS PROTOCOL SUITED FOR IMPLEMENTING LEVELS OF SERVICE IN PUBLIC AND PRIVATE ENVIRONMENTS

(71) Applicant: International Business Machines Corporation, Armonk, NY (US)

(72) Inventors: Lydia M. Do, Raleigh, NC (US); Sasikanth Eda, Andhra pradesh (IN); Riyazahamad M. Shiraguppi, Maharashtra (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 232 days.

(21) Appl. No.: 14/950,265

(22) Filed: Nov. 24, 2015

(65) Prior Publication Data
US 2017/0063103 A1    Mar. 2, 2017

Related U.S. Application Data

(63) Continuation of application No. 14/840,241, filed on Aug. 31, 2015.

(51) Int. Cl.
*H02J 17/00* (2006.01)
*H02J 50/12* (2016.01)
(Continued)

(52) U.S. Cl.
CPC .............. *H02J 17/00* (2013.01); *H02J 50/12* (2016.02); *H02J 50/80* (2016.02); *H04W 12/06* (2013.01); *H04L 63/083* (2013.01); *H04W 12/04* (2013.01)

(58) Field of Classification Search
None
See application file for complete search history.

(56) References Cited

U.S. PATENT DOCUMENTS

| 8,111,042 B2 * | 2/2012 | Bennett | G06Q 20/3674 |
| | | | 307/149 |
| 8,547,057 B2 * | 10/2013 | Dunworth | G06Q 30/0267 |
| | | | 320/108 |

(Continued)

OTHER PUBLICATIONS

List of IBM Patents or Patent Applications Treated as Related; Date Filed: Nov. 24, 2015, 2 pages.

*Primary Examiner* — Jeffrey Zweizig
(74) *Attorney, Agent, or Firm* — Cantor Colburn LLP; Kurt Goudy

(57) ABSTRACT

Embodiments are directed to a system for transferring power wirelessly from a transmitter to a receiver, the transmitter having a transmitter processor and a transmitter antenna. The system includes the transmitter processor configured to convert electric power signals to an electromagnetic field (EMF); associate each of a plurality of keys with one of a plurality of operating frequencies, and store the plurality of keys associated with the plurality of operating frequencies in a table; select one of the plurality of operating frequencies stored in the table as an active operating frequency, wherein the active operating frequency is assigned as the current operating frequency of the transmitter antenna, and wherein the key associated with the active operating frequency is assigned as an active key; wirelessly transmit to the receiver the EMF at the active operating frequency; and wirelessly transmit to the receiver the table and an identification of the active key.

7 Claims, 9 Drawing Sheets

(51) Int. Cl.
    *H02J 50/80*     (2016.01)
    *H04W 12/06*     (2009.01)
    *H04W 12/04*     (2009.01)
    *H04L 29/06*     (2006.01)

(56) References Cited

U.S. PATENT DOCUMENTS

| | | | |
|---|---|---|---|
| 9,615,254 B2* | 4/2017 | Lord | H02J 17/00 |
| 2015/0364923 A1* | 12/2015 | Fine | H02J 5/005 |
| | | | 307/31 |
| 2017/0063099 A1 | 3/2017 | Do et al. | |

\* cited by examiner

SECURE WIRELESS POWER ACCESS PROTOCOL SUITED FOR IMPLEMENTING LEVELS OF SERVICE IN PUBLIC AND PRIVATE ENVIRONMENTS

DOMESTIC PRIORITY

The present application claims priority to U.S. Nonprovisional application Ser. No. 14/840,241 filed on Aug. 31, 2015 titled "SECURE WIRELESS POWER ACCESS PROTOCOL SUITED FOR IMPLEMENTING LEVELS OF SERVICE IN PUBLIC AND PRIVATE ENVIRONMENTS," assigned to the assignee hereof and expressly incorporated by reference herein

BACKGROUND

The present disclosure relates in general to wireless power transfer. More specifically, the present disclosure relates to systems and methodologies for effectively and efficiently controlling the access to, and the levels of service within, a wireless power transfer (WPT) system.

WPT is the transmission of energy or electric power from a power source through an air gap to an electric load. In a typical WPT system, energy is transferred from a source/transmitter to a load/receiver via an oscillating magnetic field, thereby eliminating the need for physical connections between the source and the load. In an exemplary WPT configuration, direct current (DC) supplied by a power source is converted to high frequency alternating current (AC) by specially designed electronic circuits built into a transmitter. The AC energizes a copper wire coil in the transmitter, which generates a magnetic field. When a second coil at a receiver is placed within proximity of the transmitter, the magnetic field induces AC in the receiving coil. Electronic circuits in the receiver convert the AC back into DC, which becomes usable power. The distance over which energy can be transferred wirelessly from a transmitter to a receiver in the above-described configuration is increased if the transmitter coils and the receiver coils are resonating at the same operating frequency (i.e., the resonant frequency).

Merchants often provide free convenience services as a way to attract potential customers to the merchant's facility and/or improve the potential customer's shopping experience. With the proliferation of smartphones and other mobile, wireless PDA (personal digital assistant) devices, customer convenience services are often designed to leverage the likelihood that most visitors to a merchant's facility have some form of wireless PDA device. For example, it is common for free Wi-Fi connections to be offered as a customer convenience service in business facilities such as airports, coin-operated laundries, coffee shops, grocery and book stores, public parks, gyms, hotels and fast-food restaurants.

Although customer convenience services are typically provided free of charge, merchants still desire the ability to effectively and efficiently control access to, as well as the available levels of service within, the merchant's WPT customer convenience offerings.

SUMMARY

Embodiments are directed to a system for transferring power wirelessly from a transmitter to a receiver, the transmitter having a transmitter processor and a transmitter antenna. The system includes the transmitter processor configured to convert electric power signals to an electromagnetic field (EMF); associate each of a plurality of keys with one of a plurality of operating frequencies, and store the plurality of keys associated with the plurality of operating frequencies in a table; select one of the plurality of operating frequencies stored in the table as an active operating frequency, wherein the active operating frequency is assigned as the current operating frequency of the transmitter antenna, and wherein the key associated with the active operating frequency is assigned as an active key; wirelessly transmit to the receiver the EMF at the active operating frequency; and wirelessly transmit to the receiver the table and an identification of the active key.

Embodiments are further directed to a method of wirelessly transferring electric power from a transmitter to a receiver, the transmitter having a transmitter processor and a transmitter antenna circuit. The method includes converting an electric power signal to an EMF; associating each of a plurality of keys with one of a plurality of operating frequencies, and storing the plurality of keys associated with the plurality of operating frequencies in a table; selecting one of the plurality of operating frequencies stored in the table as an active operating frequency, wherein the active operating frequency is assigned as the current operating frequency of the transmitter antenna, and wherein the key associated with the active operating frequency is assigned as an active key; wirelessly transmitting to the receiver the EMF at the active operating frequency; and wirelessly transmitting to the receiver the table and an identification of the active key.

Embodiments are further directed to a computer program product for controlling a wireless transfer of electric power from a transmitter to a receiver, the transmitter having at least one transmitter processor circuit and at least one transmitter antenna circuit. The computer program product includes a computer readable storage medium having program instructions embodied therewith, wherein the computer readable storage medium is not a transitory signal per se, the program instructions readable by the at least one processor circuit to cause the at least one processor circuit to perform a method. The method includes converting an electric power signal to an EMF; associating each of a plurality of keys with one of a plurality of operating frequencies, and storing the plurality of keys associated with the plurality of operating frequencies in a table; selecting one of the plurality of operating frequencies stored in the table as an active operating frequency, wherein the active operating frequency is assigned as the current operating frequency of the transmitter antenna, and wherein the key associated with the active operating frequency is assigned as an active key; wirelessly transmitting to the receiver the EMF at the active operating frequency; and wirelessly transmitting to the receiver the table and an identification of the active key.

Additional features and advantages are realized through the techniques described herein. Other embodiments and aspects are described in detail herein. For a better understanding, refer to the description and to the drawings.

BRIEF DESCRIPTION OF THE DRAWINGS

The subject matter which is regarded as the present disclosure is particularly pointed out and distinctly claimed in the claims at the conclusion of the specification. The foregoing and other features and advantages are apparent from the following detailed description taken in conjunction with the accompanying drawings in which:

Figure 1:
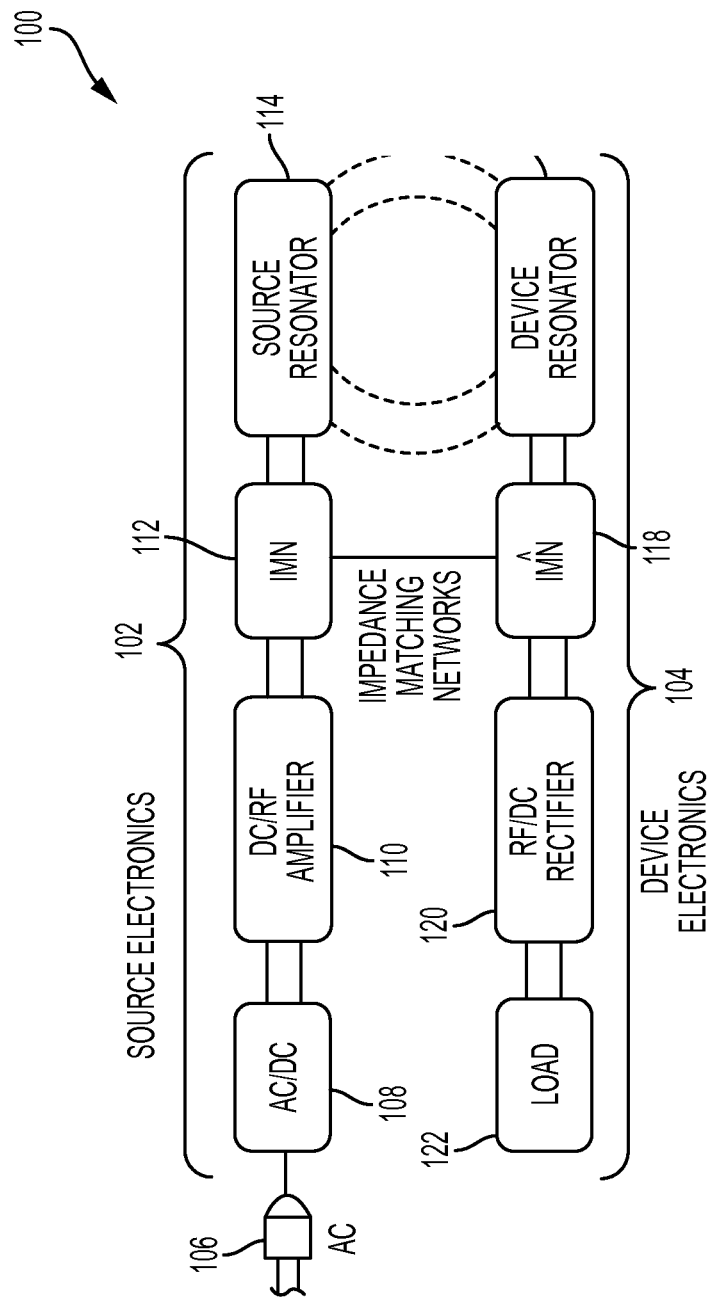
FIG. 1 depicts a diagram of a WPT system capable of utilizing one or more embodiments.

In the accompanying figures and following detailed description of the disclosed embodiments, the various elements illustrated in the figures are provided with three or four digit reference numbers. The leftmost digit(s) of each reference number corresponds to the figure in which its element is first illustrated.

DETAILED DESCRIPTION

Various embodiments of the present disclosure will now be described with reference to the related drawings. Alternate embodiments may be devised without departing from the scope of this disclosure. It is noted that various connections are set forth between elements in the following description and in the drawings. These connections, unless specified otherwise, may be direct or indirect, and the present disclosure is not intended to be limiting in this respect. Accordingly, a coupling of entities may refer to either a direct or an indirect connection.

It is understood in advance that although this disclosure includes references to particular WPT systems and methodologies, implementation of the teachings recited herein are not limited to modeling any particular WPT environment. Rather, embodiments of the present disclosure are capable of being implemented in conjunction with any other type of WPT environment, now known or later discovered. Additionally, although disclosed embodiments utilize binary phase shift keying as a modulation technique, other forms of digital modulation techniques may be utilized, including but not limited to amplitude phase shift keying, frequency shift keying, quadrature phase shift keying and differential phase shift keying.

WPT is a technology that uses air as a medium/channel for transferring power or electricity from a source to a destination. The source is typically a power transmitter, which may consists of an amplifier circuit used to increase the transmitted signal strength and a resonator/antenna circuit used to convert power/electricity to a radio frequency wave. The destination is typically a power absorbing/receiving circuit connected to a load such as a mobile telephone, TV, laptop electric car, etcetera. The power absorbing receiver may consist of a resonator/antenna coupled with a matching filter network tuned to the source resonator frequency (a.k.a., the operating frequency).

FIG. 1 depicts a WPT system 100 capable of incorporating one or more embodiments of the present disclosure. WPT system 100 includes source electronic circuitry 102 and device electronic circuitry 104. Source electronic circuitry 102 include an AC source circuitry 106, an AC/DC converter circuit 108, a DC/RF converter/amplifier circuit 110, a source impedance matching network 112 and a source resonator/antenna circuit 114, configured and arranged as shown. Device electronic circuitry 104 includes a device resonator/antenna circuit 116, a device impedance matching network 118, an RF/DC converter/rectifier circuit 120 and a load circuit 122, configured and arranged as shown. In operation, AC source circuitry 106 provides alternating current (AC) to AC/DC converter circuit 108, which converts AC to direct current (DC). DC/RF converter circuit 108 amplifies the DC and modulates the DC onto an RF (radio frequency) signal. Source impedance matching networks 112, 118 work in concert to match the internal impedance of source electronic circuitry 102 to load circuit 122. Source resonator/antenna circuit 114 wirelessly transmits the amplified, DC modulated RF power signal to device resonator/antenna circuit 116. The distance over which the amplified, DC modulated RF power signal can be transferred wirelessly is increased if source resonator/antenna circuit 114 and device resonator/antenna circuit 116 are resonating at the same operating frequency (i.e., the resonant frequency). RF/DC rectifier circuit 120 removes the DC signal from the RF signal and provides DC to load circuit 122.

Power transfer in a WPT system may be implemented using a variety of transfer techniques, including for example, induction, radio waves, evanescent wave coupling and lasers. Induction-based power transfer depends on a linkage of the magnetic flux changes between the source coils and the destination coils. A changing current in the source coils creates an EMF, which in turn induces a current in the destination coils. Induction-based power transfer transmits energy from the source coils to the destination coils within a relatively short distance. An example of a WPT system that uses primarily induction-based power transfer is an electric toothbrush charger. Radio-wave-based power transfer incorporates a so-called "rectenna," which is a combination of a rectifying circuit and an antenna. The destination antenna receives the EMF power and the rectifying circuit converts it to DC electric power. In evanescent wave coupling power transfer, the distance at which energy can be transferred wirelessly from the source to the destination is increased if the source coils and the destination coils are resonating at the same frequency (i.e., the resonant frequency). Laser-based power transfer (i.e., power beaming) incorporates a laser and a photovoltaic or solar cell. Electricity at the source is converted into a laser beam, which consists of coherent radiation. The beam is pointed towards a photovoltaic cell at the receiver, which converts the received laser light energy back to electricity. Power transfer in a WPT system may occur using any of the above-described techniques alone or in combination.

In order to transfer power over relatively longer distances, it is necessary that some form of evanescent wave coupling power transfer is incorporated such that the source coils and the destination coils are resonating at the same frequency (i.e., the resonant frequency). Accordingly, the effectiveness of WPT technology that transfers over a longer distance depends on the effectiveness of the resonance/rectenna operation, which in turn depends on the operation frequency that is tuned between the source and the destination. In some implementations, an equation known as the "friis" transmission formula is used to represent the ratio of power received to the power transmitted (e.g., as often used in radio wave based power transfer) and its relation to the frequency of operation. However, in many implementations, it is simpler and more efficient to use a preset frequency of operation, and to select the preset frequency of operation from among the eleven (11) known ISM frequency band ranges and respective bandwidth variations.

As previously noted herein, merchants often provide free convenience services as a way to attract potential customers to the merchant's facility and/or improve the potential customer's shopping experience. With the proliferation of smartphones and other mobile, wireless PDA (personal digital assistant) devices, customer convenience services are often designed to leverage the likelihood that most visitors to a merchant's facility have some form of wireless PDA. For example, a common customer convenience service is to offer free Wi-Fi connections in business facilities such as airports, coin-operated laundries, coffee shops, grocery and book stores, public parks, gyms, hotels and fast-food restaurants.

Although customer convenience services are typically free, merchants still desire the ability to control access to such services. For example, in a WPT customer convenience offering, a merchant may desire to limit access to the WPT system to actual customers who make a purchase. For customers who make a purchase and are granted access to the WPT system, a merchant may desire to offer different levels of service to different customers. For example, for customers having long standing business relationships with the merchant (e.g., multiple past purchases), the merchant may desire to grant such "privileged" customers access to the WPT system for longer durations (e.g., 3 months, 6 months, 1 year, etc.), while for customers having more short term business relationships with the merchant (e.g., zero or sporadic past purchases), the merchant may desire to grant such "non-privileged" customers access to the WPT system for shorter durations (e.g., 30 minutes, 90 minutes, 1 day, etc.).

Traditional password protection methodologies alone are often insufficient to limit access to, and offer different levels of service within, a WPT system. For example, as previously noted herein, it is often simpler and more efficient in WPT systems to use a preset frequency of operation, and to select the preset frequency of operation from the eleven (11) ISM frequency band ranges and respective bandwidth variations. Even if such a WPT system includes password protection, a hacker or intruder who desires to access the WPT system without a password may do so by simply guessing or deducing the preset operating frequency from among the eleven (11) ISM frequency band ranges and tuning a receiver to that preset operating frequency. Accordingly, it is a challenge for merchants to effectively and efficiently control access to, and the levels of service within, the merchant's WPT customer convenience offerings.

Turning now to an overview of the present disclosure, one or more embodiments provide systems and methodologies for effectively and efficiently controlling the overall access to, and the levels of service within, a WPT system. According to one or more embodiments, the disclosed WPT system includes a transmitter, a wireless transmission medium/channel and a receiver. The WPT system controls the level of service at least in part according to disclosed user name and password techniques, and controls overall access to the WPT system at least in part according to disclosed user name and password techniques working in tandem with disclosed ongoing access control technique, wherein the wireless power signal is transmitted at an operational frequency that is varied according to a key.

The disclosed WPT system is configured to generate a plurality of different keys, along with a plurality of different operating frequencies, and to associate each one of the plurality of keys with one of the plurality of operating frequencies. The WPT system selects from among the plurality of operating frequencies a current or "active" operating frequency at which the transmitter antenna currently transmits the wireless power signal, and varies the active operating frequency according to one of the plurality of keys. Thus, each key points to and/or identifies a potential operating frequency of the transmitter. At any point in time, one of the plurality of keys is "active," and the active key's associated operating frequency is the active operating frequency at which the transmitter antenna is currently transmitting the wireless power signal. The transmitter is configured to changes the active operating frequency, either periodically or randomly, or using a combination of periodic and random changes. Changing the active operating frequency in turn changes the active key that points to and/or identifies the active operating frequency. When received and/or accessed by the receiver, the active key (or an identifier that identifies or points to the active key) is used by the receiver to identify the active transmitter operating frequency. The receiver uses the active transmitter frequency to tune the receiver's antenna to the active transmitter operating frequency, thereby synchronizing the receiver antenna with the transmitter antenna and allowing the receiver antenna to receive and access the transmitted wireless power signal.

The disclosed WPT system may associate the plurality of keys with the plurality of operating frequencies by preselecting an association of each key with an operation frequency and storing the keys, the operating frequencies and the associations between them in a searchable mapping table. The WPT system provides the mapping table to the receiver, along with the active key (or an identifier that identifies or points to the active key). The receiver locates the active key entry in the mapping table and uses the active key entry to point to or identify the table entry containing the active operating frequency associated with the active key entry.

The key may take a variety of forms, including for example, a digital signal that is modulated onto the transmitted wireless power signal. The digital signal may be modulated according to a binary phase shift keying (BPSK) modulation scheme, or another known digital modulation schemes may be used. Alternatively, the key may be duration or range of time during which the active key is active.

A customer's initial access to the WPT system is established by providing the customer's receiver unit with a user name and/or password, which are then used to provide the customer's receiver unit with initial entry to the WPT system and are also used to determine the customer receiver unit's level of service. The user name and/or password are mapped (e.g., using the previously described mapping table) to the plurality of keys and the plurality of operating frequencies. The customer receiver unit, after having established a valid user name and/or password, is provided with the mapping table, uses the mapping table to locate the active key that points to the active operational frequency, tunes the customer receiver unit to the active operational frequency and access the wireless power signal. As long as the user name and password are valid and/or unexpired, the customer receiver unit will continue to receive the currently active key (or an identifier that identifies or points to the active key) and perform the above-described operation to locate the corresponding active operating frequency in the mapping table and tune the customer receiver unit to the currently active operating frequency.

The disclosed user name and/or password technique may be used to control the level of service within the WPT system in a variety of ways. For example, a merchant may provide the option of selecting a user name and/or password only to actual customers who make a purchase. For customers who are provided with a user name and/or password that may be used to access the WPT system, a merchant may attach expiration dates/times and/or validity periods to the user name and/or password that correspond to different levels of service for different customers. For example, for customers having long standing business relationships with the merchant (e.g., multiple past purchases), the merchant may grant such "privileged" customers user names and/or passwords that may be sued to access the WPT system for longer durations (e.g., 3 months, 6 months, 1 year, etc.), while for customers having more short term business relationships with the merchant (e.g., zero or sporadic past purchases), the merchant may grant such "non-privileged" customers user names and/or passwords that may be used to access to the WPT system for shorter durations (e.g., 30 minutes, 90 minutes, 1 day, etc.).

According to one or more embodiments, the customer receiver unit of the disclosed WPT system may be configured to perform the above described functions based on a set of WPT program instruction contained in a WPT software application that is provided to and downloaded by the customer receiver unit. The WPT software application may include the above-described mapping table, or the mapping table may be loaded into the customer receiver unit separately. Alternatively, the above described functionality of the customer receiver unit may be built into the customer receiver unit.

Turning now to a more detailed description of the present disclosure, an exemplary embodiment will now be described with reference to a WPT system 200 shown FIG. 2, a methodology 300 shown in FIG. 3 and a mapping table 400A shown in FIG. 4. In general WPT system 200 implements methodology 300 while making use of mapping table 400A shown in FIG. 4, wherein the key is a digital key, or alternatively making use of mapping table 400B shown in FIG. 5, wherein the key is a time range key. WPT system 200 include an AC/RF generator 202, a resonator/antenna 204, a resonator/antenna 206, a filter network 208 and a receiver device 210, configured and arranged as shown.

Figure 2:
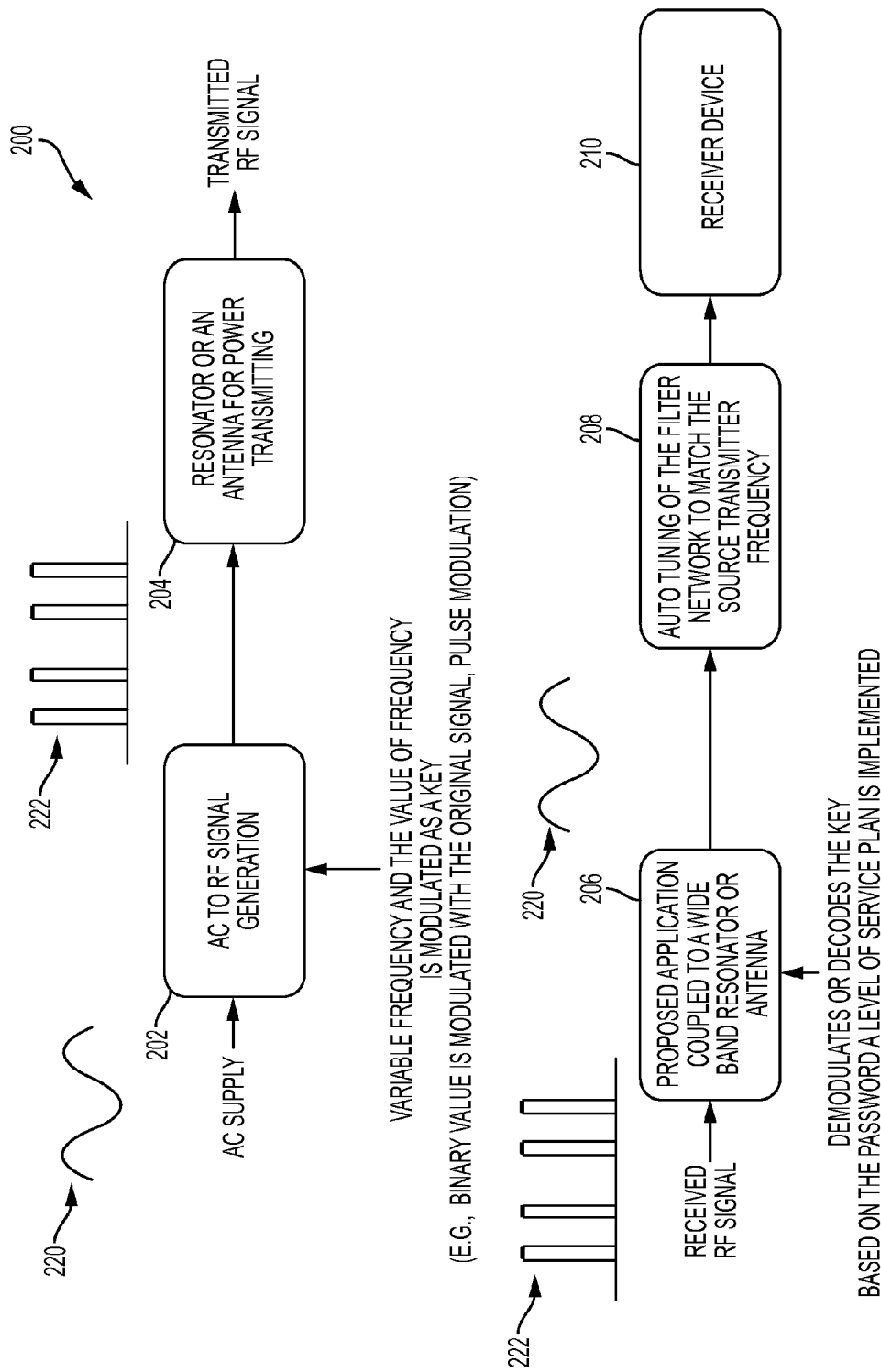
FIG. 2 depicts a diagram of a WPT system incorporating one or more embodiments.
Figure 3:
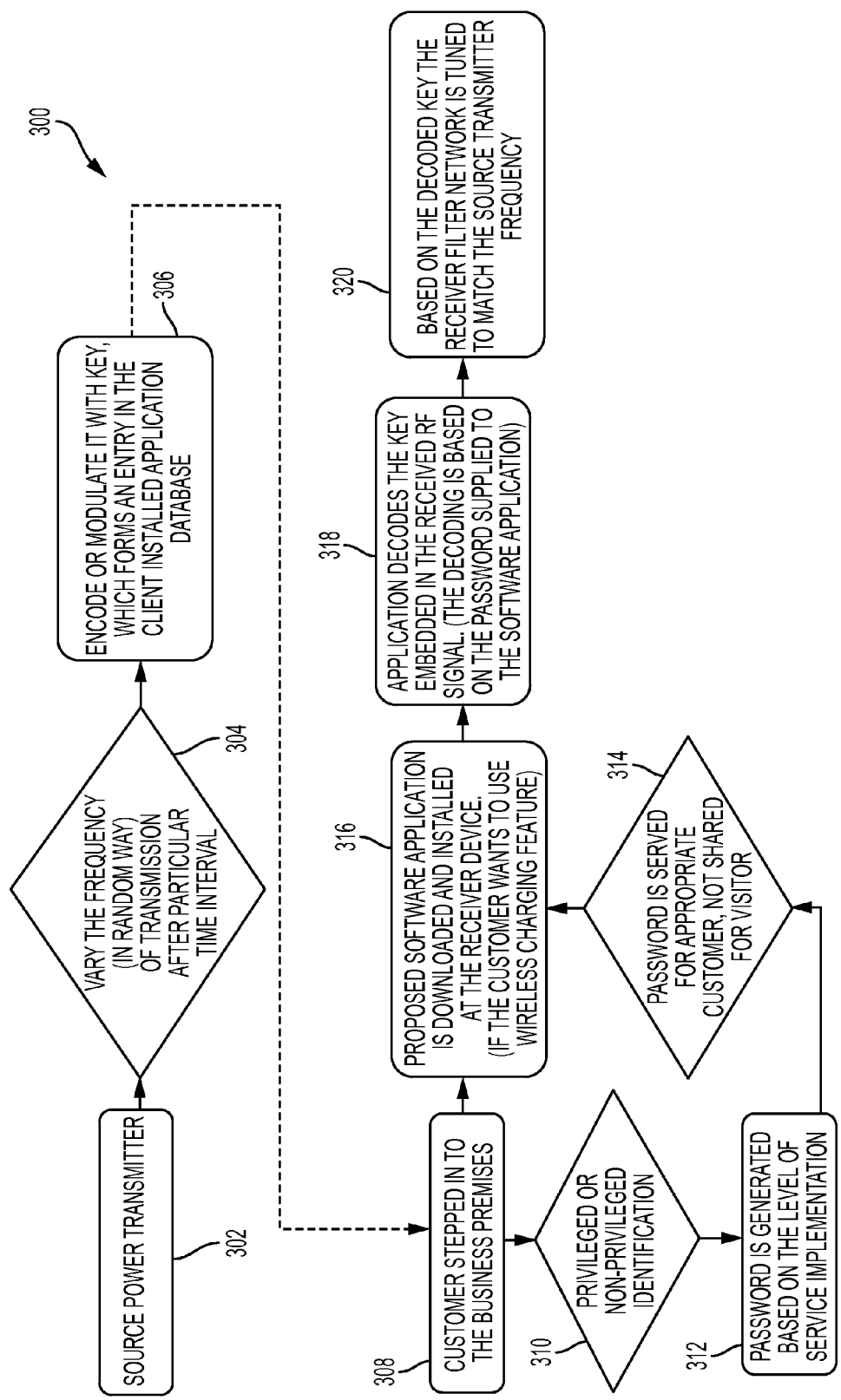
FIG. 3 depicts a methodology according to one or more embodiments.

In operation, WPT system 200 shown in FIG. 2 is configured to generate a plurality of different keys, along with a plurality of different operating frequencies, and to associate each one of the plurality of keys with one of the plurality of operating frequencies. WPT system 200 selects from among the plurality of operating frequencies a current or "active" operating frequency at which resonator/antenna 204 currently transmits the wireless power signal, and varies the active operating frequency according to one of the plurality of keys. Thus, each key points to and/or identifies a potential operating frequency of resonator/antenna 204. At any point in time, one of the plurality of keys is "active," and the active key's associated operating frequency is the active operating frequency at which resonator/antenna 204 is currently transmitting the wireless power signal. WPT system 200 through AC/RF generator 202 is configured to change the active operating frequency, either periodically or randomly, or using a combination of periodic and random changes. Changing the active operating frequency in turn changes the active key that points to and/or identifies the active operating frequency. As described in greater detail herein below, when received and/or accessed by resonator/antenna 206, the active key (or an identifier that identifies or points to the active key) is provided by resonator/receiver 206 to filter network 208, which uses the active key to identify or point to the active operating frequency. Filter network 208 retrieves and tunes to the active operating frequency, thereby synchronizing resonator/antenna 206 with resonator/antenna 204 and allowing resonator/antenna 206 to receive and access the transmitted wireless power signal.

Figure 4:
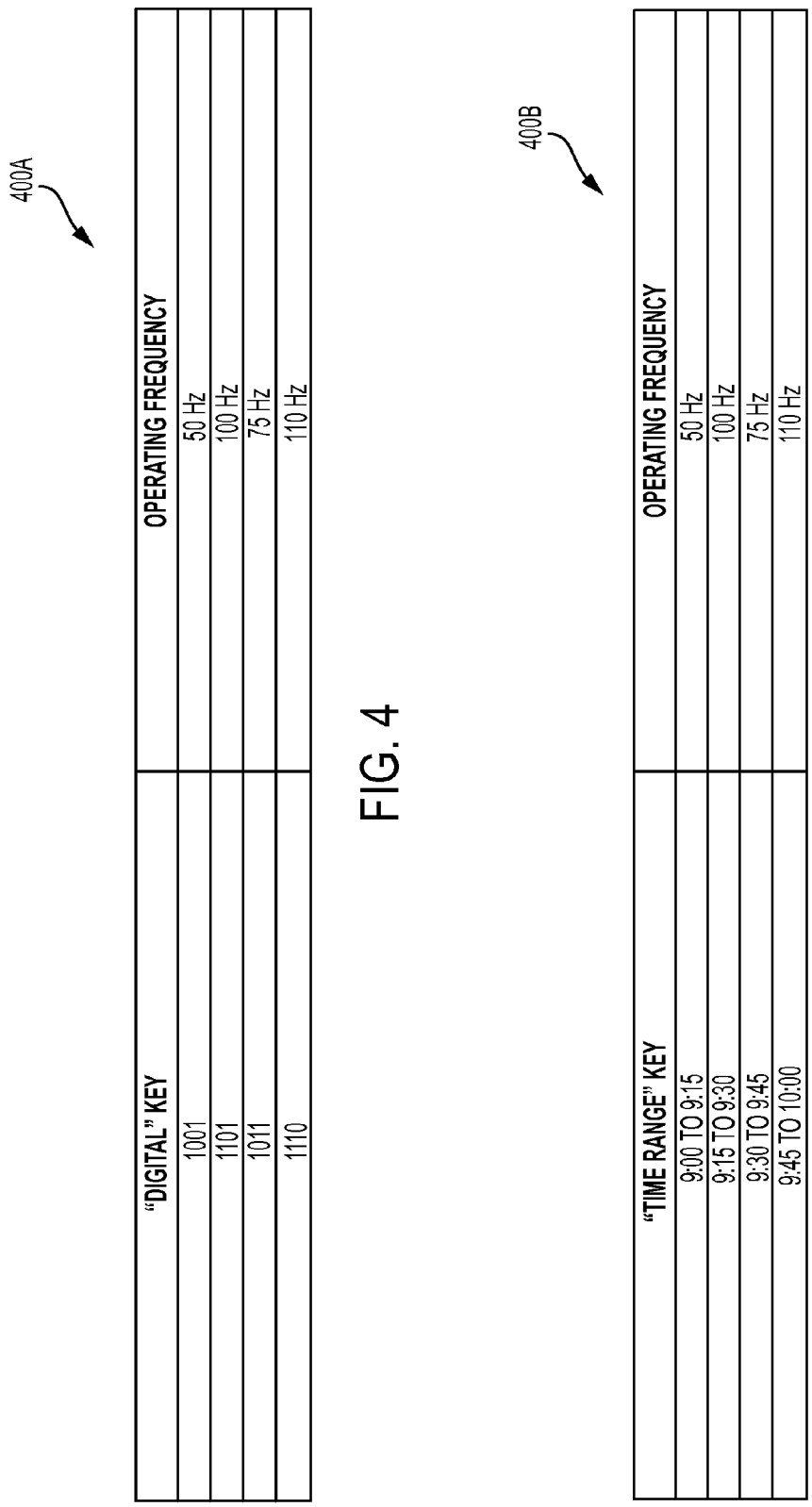
FIG. 4 depicts a mapping table according to one or more embodiments.
Figure 5:
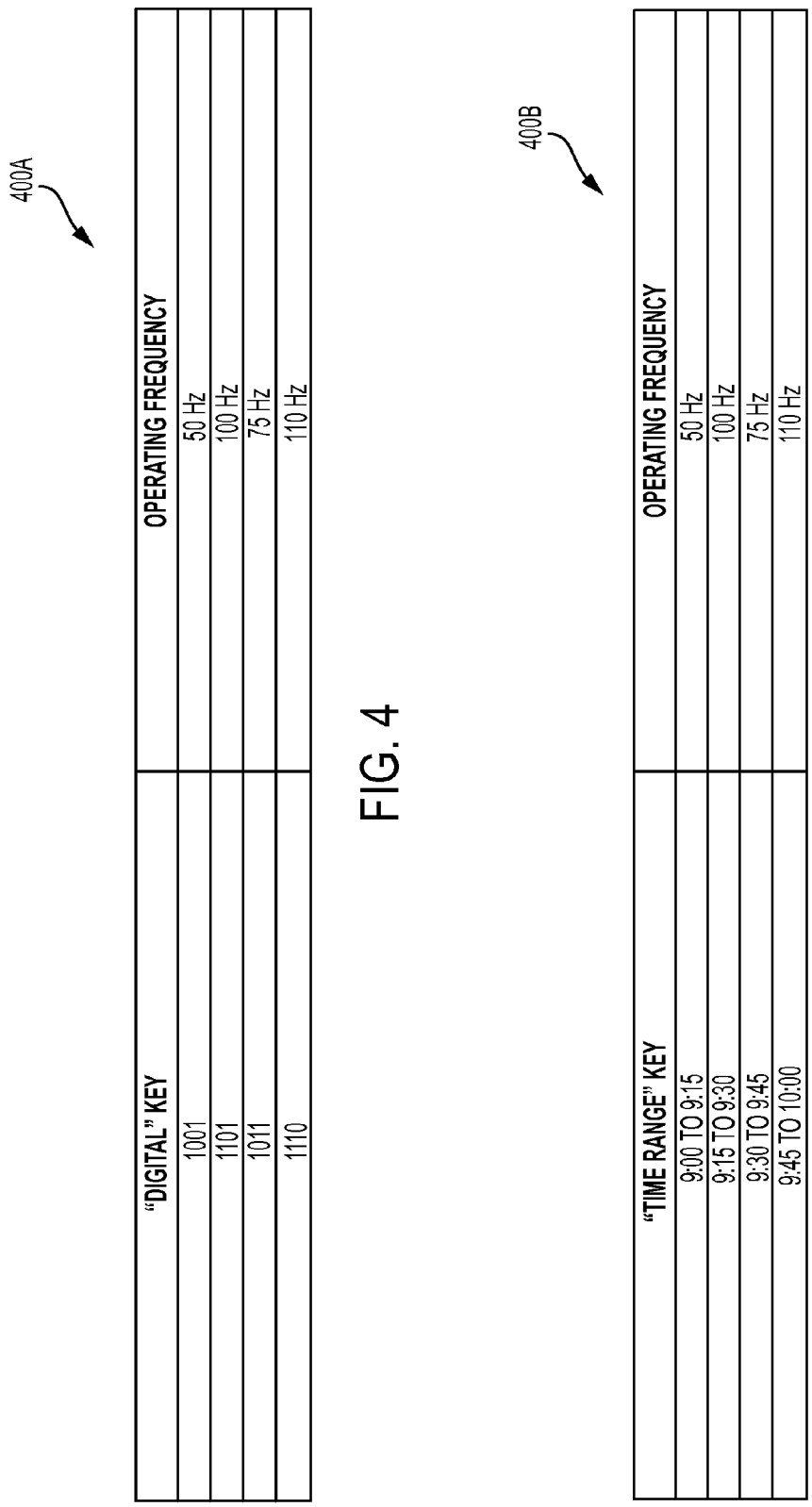
FIG. 5 depicts another mapping table according to one or more embodiments.

WPT system 200 associates the plurality of keys with the plurality of operating frequencies by preselecting an association of each key with an operation frequency and storing the keys, the operating frequencies and the associations between them in a searchable mapping table 400A shown in FIG. 4. For ease of illustration, mapping table 400A illustrates only four operating frequencies and four corresponding and associated digital keys. In practice, a larger number of digital key and operating frequency associations may be stored. FIG. 5 illustrates an alternative mapping table 400B, wherein the key is a time range.

As shown in FIG. 2, an AC power signal 220 (block 302 in FIG. 3) is input to AC/RF generator 202, which varies AC power signal 220 randomly (block 304 shown in FIG. 3) and modulates AC power signal 220 with a digital key (block 306 in FIG. 3) to generate a key modulated signal 222. The digital key modulation may be performed by a binary phase shift keying (BPSK) modulation scheme. BPSK modulation uses two opposite signal phases (zero and 180 degrees). The digital signal is broken up time-wise into individual bits (binary digits). The state of each bit is determined according to the state of the preceding bit. If the phase of the wave does not change, then the signal state stays the same (zero or one). If the phase of the wave changes by 180 degrees, i.e., if the phase reverses, then the signal state changes from zero to one, or from one to zero. Resonator/antenna 204 transmits key modulated signal 222 as an RF signal over a wireless channel/medium (not shown).

The transmitted RF signal, which is an RF version of key modulated signal 222, is received at resonator/antenna 206, which utilizes a set of WPT program instruction contained in a WPT software application that is provided to and downloaded by resonator/antenna 206. The WPT software application may include mapping table 400A (shown in FIG. 4). The WPT software application proceeds according to the operations shown as blocks 308, 310, 312, 314, 316, 318 of FIG. 3. As shown in block 308, a customer enters a business that offers WPT system 200 as a customer convenience offering. Block 310 determines whether or not the customer is a privileged or a non-privileged customer. Customers having long standing business relationships with the business (e.g., multiple past purchases) may be designated as "privileged" and granted access to WPT system 200 for longer durations (e.g., 3 months, 6 months, 1 year, etc.). Customers having more short term business relationships with the business (e.g., zero or sporadic past purchases) may be designated as "non-privileged" and granted access to WPT system 200 for shorter durations (e.g., 30 minutes, 90 minutes, 1 day, etc.). Block 312 generates a password, and optionally a user name, based at least in part on the level of service implementation, i.e., based at least in part on whether the customer is privileged or non-privileged. In block 314, the appropriate password is generated and provided to the appropriate customer. In block 316, if the customer indicates his/her desire to use WPT system 200 to receive and access AC power signal 220, the customer downloads and installs the WPT software application at the receiver device. In block 318, the WPT software application decodes the digital key embedded in the received RF signal, and the decoding is based on the password supplied for the customer to the WPT software application.

Returning to FIG. 2, filter network 208 uses the active key provided by the WPT software application to identify or point to the active operating frequency using mapping table 400A (shown in FIG. 4). Filter network 208 retrieves and tunes (block 320 shown in FIG. 3) to the active operating frequency, thereby synchronizing resonator/antenna 206 with resonator/antenna 204 and allowing resonator/antenna 206 to receive the RF signal and access AC power signal 220, which is subsequently provided through filter network 208 to receiver device 210.

Figure 6:
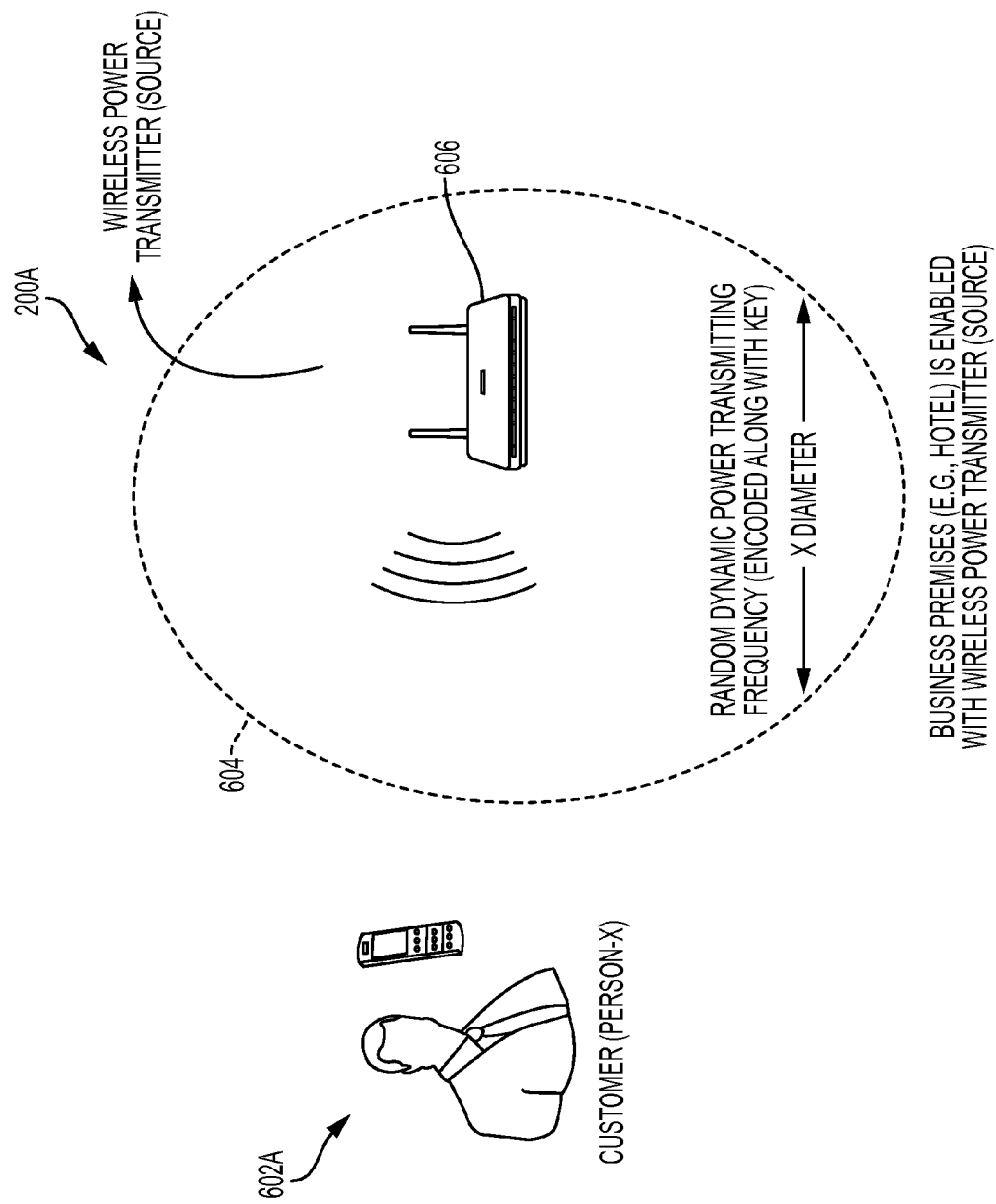
FIG. 6 depicts a diagram of an exemplary implementation scenario according to one or more embodiments.
Figure 7:
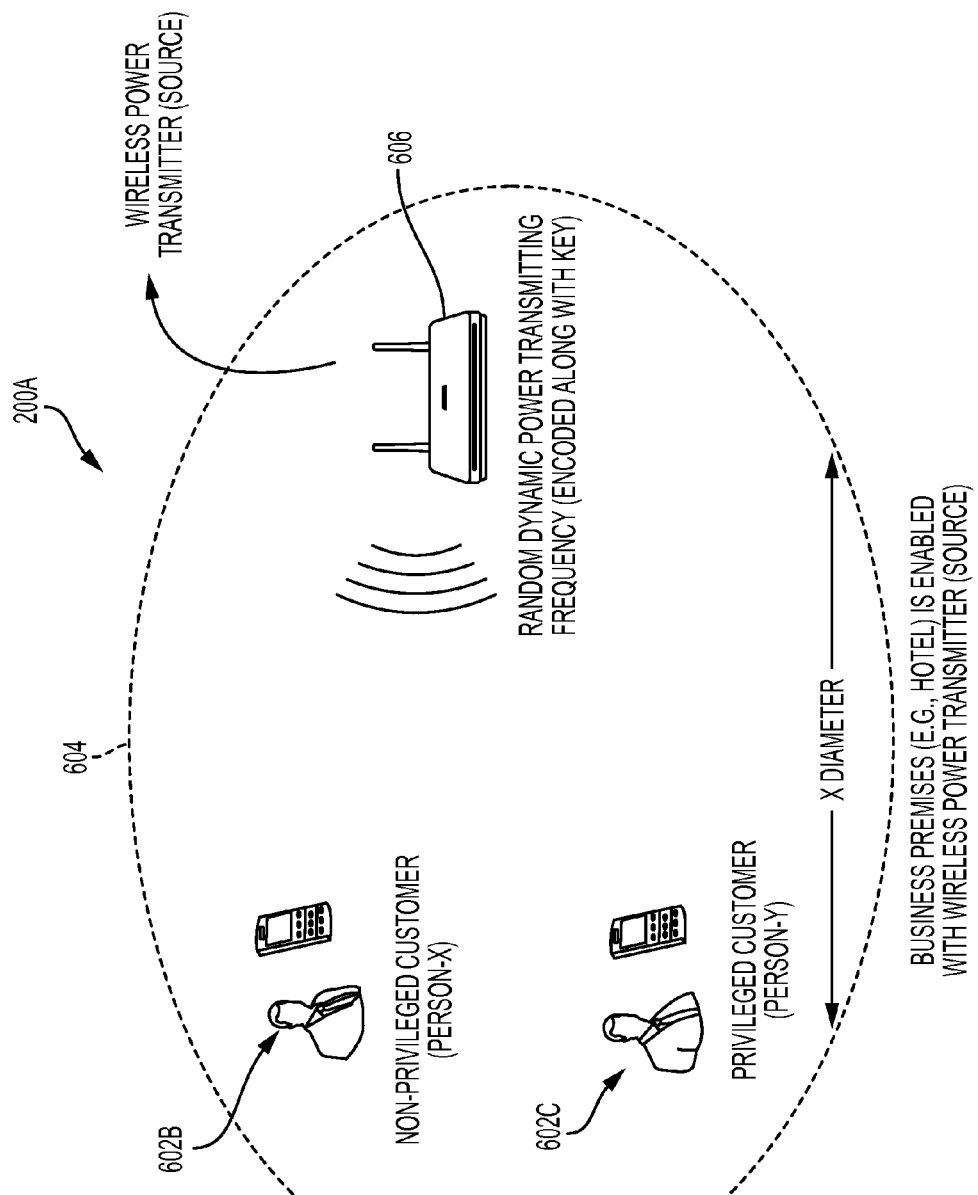
FIG. 7 depicts a diagram of an exemplary implementation scenario according to one or more embodiments.
Figure 8:
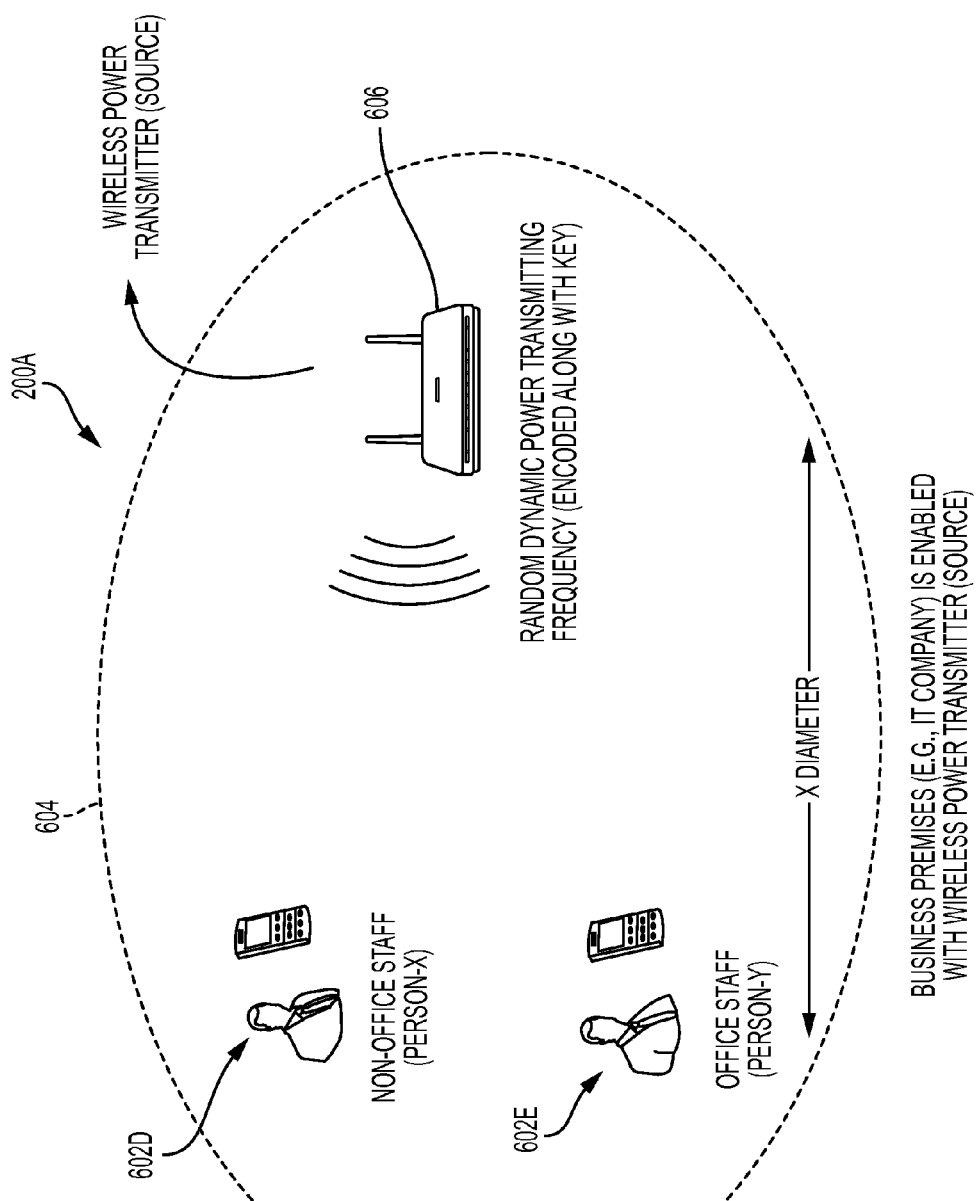
FIG. 8 depicts a diagram of an exemplary implementation scenario according to one or more embodiments.

Exemplary implementation scenarios according to one or more embodiments will now be described with reference to FIGS. 6, 7 and 8. More specifically, FIGS. 6, 7 and 8 depict implementation scenarios wherein a customer (or potential customer) 602A, 602B, 602C, 602D, 602E carrying some form of mobile PDA (e.g., smartphone, laptop, tablet, etc.) is about to enter, or is actually within, a coverage area 604 defined by a wireless power transmitter 606 of a WPT system 200A according to one or more embodiments. WPT system 200A operates according to the functionality of WPT system 200 (shown in FIG. 2) and methodology 300 (shown in FIG. 3).

In general, a business (e.g., a hotel or an IT company) desires to offer to customers and/or employees access to WPT system 200A free of charge as a customer/employee convenience offering. Although the business is not extracting a fee for access to WPT system 200A, the business still desires to control the access to, and the level of service available within, WPT system 200A.

FIG. 6 depicts a scenario wherein customer 602A has not yet entered coverage area 604. Because customer 602A is outside of coverage area 604, no interaction occurs between customer 602A (via the customers mobile PDA) and wireless power transmitter 606.

FIG. 7 depicts a scenario wherein non-privileged customer 602B and privileged customer 602C are inside coverage area 604 of a hotel that offers WPT system 200A as a free of charge customer convenience and distinguishes levels of service within WPT system 200A between privileged customers and non-privileged customers. Once customers 602B, 602C check into the hotel and become registered guests, their mobile PDA devices receive "pop-up" communications from wireless power transmitter 606 offering the option to download and install a custom application that will enable their PDA devices to access to WPT system 200A. Each customer 602B, 602C accepts the option and downloads the custom application to their respective mobile wireless PDA devices. Wireless power transmitter 606 provides each customer with a fixed username and/or password. The username/password validates the customer and identifies customer 602B as a non-privileged customer and identifies customer 602C as a privileged customer. In the present example, non-privileged customer 602B may be distinguished from privileged customer 602C based on the expiration date/time of their respective username/password. The custom application uses the valid username/password combination to register the customer's PDA device with a key generator (now shown) coupled to wireless power transmitter 606. The key generator changes the transmitter frequency (i.e., the operating frequency) based at least in part on a randomly assigned and randomly varied key, which, in the case of a digital implementation of the key, is modulated onto the power signal transmitted by wireless power transmitter 606. Accordingly, the transmitter/operating frequency is not unique and varies randomly based on the key input.

The key generator also pushes the key that is currently "active" to registered custom applications that have been downloaded to customer mobile PDA devices.

The custom application loaded onto the customer's mobile PDA device receives the periodically changing active key, along with a table (not shown) or other form of database entries, wherein a plurality of potential key values have been associated with a plurality of potential transmitter or operating frequencies. Accordingly, each key value in the table points to and/or identifies an operating frequency that may currently be in use by wireless power transmitter 606. If a key entry in the table is the active key, that active key entry's corresponding operating frequency is also active, which means that the active key entry's corresponding operating frequency is the frequency at which wireless power transmitter 606 is transmitting. At any given point in time, only one of the key entries in the table is active. Accordingly, upon receipt of the active key (or an identifier that identifies or points to the active key entry), the custom application tunes an antenna of the customer's mobile PDA to the operating frequency to thereby synchronize the PDA antenna with wireless power transmitter 606. Once synchronized with wireless power transmitter 606, the PDA antenna can receive and/or de-modulator the transmitted wireless power signal. Once the customer's username/password expires according to the customer's level of service (i.e., privileged or non-privileged), the key generator of wireless power transmitter 606 no longer pushes the currently active key to that customer's mobile PDA device.

FIG. 8 depicts a scenario wherein office staff members 602E and non-office staff members 602D are inside coverage area 604 of an IT company that offers WPT system 200A as a free of charge employee convenience and distinguishes levels of service within WPT system 200A between office staff and non-office staff. The IT company scenario of FIG. 8 is substantially the same as the hotel scenario of FIG. 7, except in the FIG. 8 IT company scenario, only office staff members are provided with passwords by which an application can be downloaded to the office staff member's PDA to tune its receiver to match wireless power transmitter 606. Non-office staff members 602D are not provided with a password. In certain scenarios, for example where non-office staff 602D is a visiting customer of the IT company, the IT company may offer to non-office staff 602D a temporary password with an appropriate expiration date. In all other respects, WPT system 200A of FIG. 8 functions in the same manner as WPT system 200A of FIG. 7.

Figure 9:
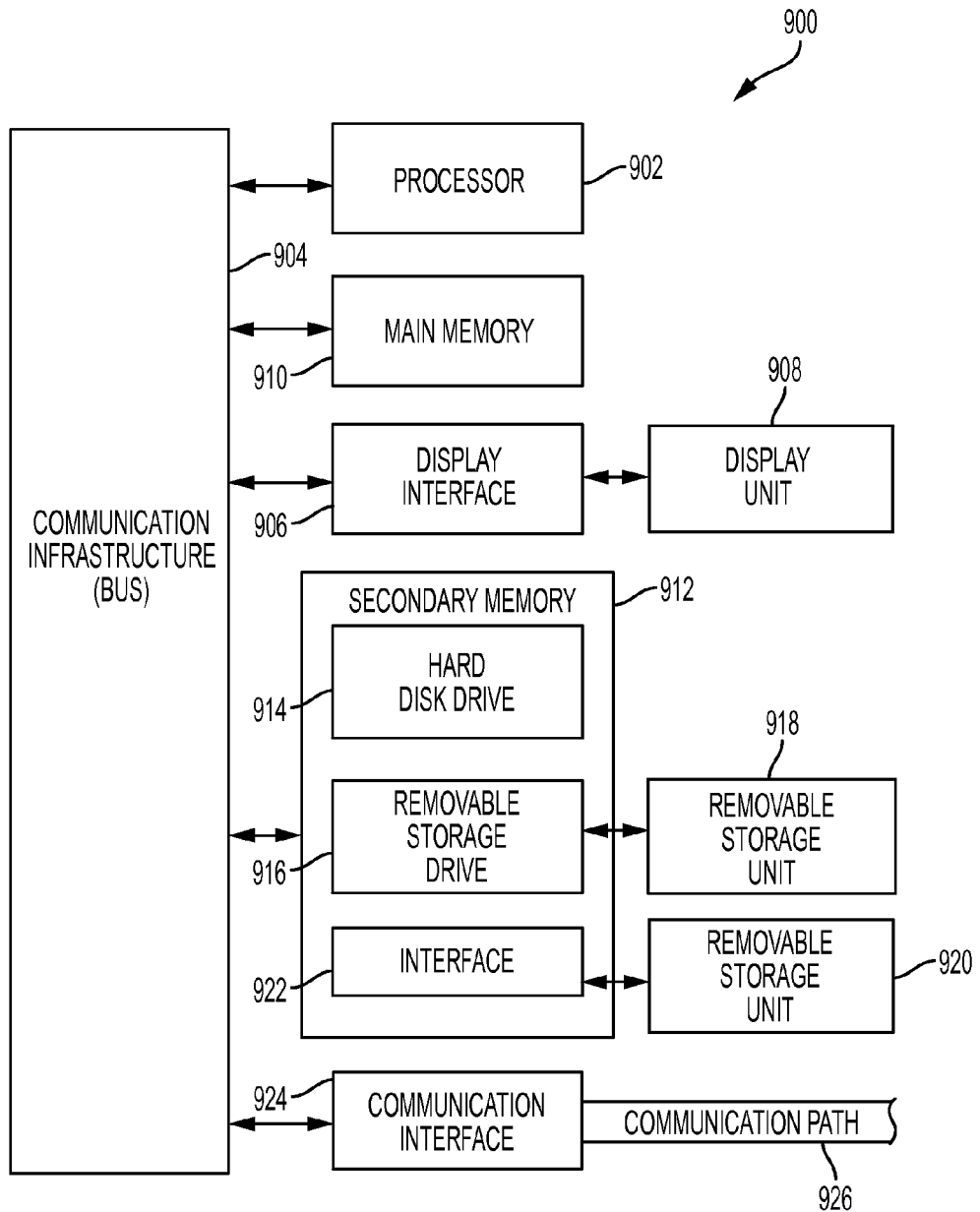
FIG. 9 depicts a computer system capable of implementing aspects of one or more embodiments.

FIG. 9 depicts a high level block diagram showing an example of a computer-based information processing system 900 useful for implementing one or more embodiments of the present disclosure, including specifically any disclosed methodologies that may be implanted as computer program instructions that control a computer-based information processing system. Although one exemplary computer system 900 is shown, computer system 900 includes a communication path 926, which connects computer system 900 to additional systems (not depicted) and may include one or more wide area networks (WANs) and/or local area networks (LANs) such as the Internet, intranet(s), and/or wireless communication network(s). Computer system 900 and additional system are in communication via communication path 926, e.g., to communicate data between them.

Computer system 900 includes one or more processors, such as processor 902. Processor 902 is connected to a communication infrastructure 904 (e.g., a communications bus, cross-over bar, or network). Computer system 900 can include a display interface 906 that forwards graphics, text, and other data from communication infrastructure 904 (or from a frame buffer not shown) for display on a display unit 908. Computer system 900 also includes a main memory 910, preferably random access memory (RAM), and may also include a secondary memory 912. Secondary memory 912 may include, for example, a hard disk drive 914 and/or a removable storage drive 916, representing, for example, a floppy disk drive, a magnetic tape drive, or an optical disk drive. Removable storage drive 916 reads from and/or writes to a removable storage unit 918 in a manner well known to those having ordinary skill in the art. Removable storage unit 918 represents, for example, a floppy disk, a compact disc, a magnetic tape, or an optical disk, etc. which is read by and written to by removable storage drive 916. As will be appreciated, removable storage unit 918 includes a computer readable medium having stored therein computer software and/or data.

In alternative embodiments, secondary memory 912 may include other similar means for allowing computer programs or other instructions to be loaded into the computer system. Such means may include, for example, a removable storage unit 920 and an interface 922. Examples of such means may include a program package and package interface (such as that found in video game devices), a removable memory chip (such as an EPROM, or PROM) and associated socket, and other removable storage units 920 and interfaces 922 which allow software and data to be transferred from the removable storage unit 920 to computer system 900.

Computer system 900 may also include a communications interface 924. Communications interface 924 allows software and data to be transferred between the computer system and external devices. Examples of communications interface 924 may include a modem, a network interface (such as an Ethernet card), a communications port, or a PCM-CIA slot and card, etcetera. Software and data transferred via communications interface 924 are in the form of signals which may be, for example, electronic, electromagnetic, optical, or other signals capable of being received by communications interface 924. These signals are provided to communications interface 924 via communication path (i.e., channel) 926. Communication path 926 carries signals and may be implemented using wire or cable, fiber optics, a phone line, a cellular phone link, an RF link, and/or other communications channels.

In the present disclosure, the terms "computer program medium," "computer usable medium," and "computer readable medium" are used to generally refer to media such as main memory 910 and secondary memory 912, removable storage drive 916, and a hard disk installed in hard disk drive 914. Computer programs (also called computer control logic) are stored in main memory 910 and/or secondary memory 912. Computer programs may also be received via communications interface 924. Such computer programs, when run, enable the computer system to perform the features of the present disclosure as discussed herein. In particular, the computer programs, when run, enable processor 902 to perform the features of the computer system. Accordingly, such computer programs represent controllers of the computer system.

Thus, it can be seen from the foregoing description and illustration that one or more embodiments of the present disclosure provide technical features and benefits. One or more embodiments provide systems and methodologies for effectively and efficiently controlling the overall access to, and the levels of service within, a WPT system. The disclosed WPT system includes a transmitter, a wireless transmission medium/channel and a receiver. The WPT system controls the level of service at least in part according to disclosed user name and password techniques, and controls overall access to the WPT system at least in part according to disclosed user name and password techniques working in tandem with disclosed ongoing access control technique, wherein the wireless power signal is transmitted at an operational frequency that is varied according to a key. Accordingly, access control is provided that goes beyond traditional username/password techniques alone.

Figure 10:
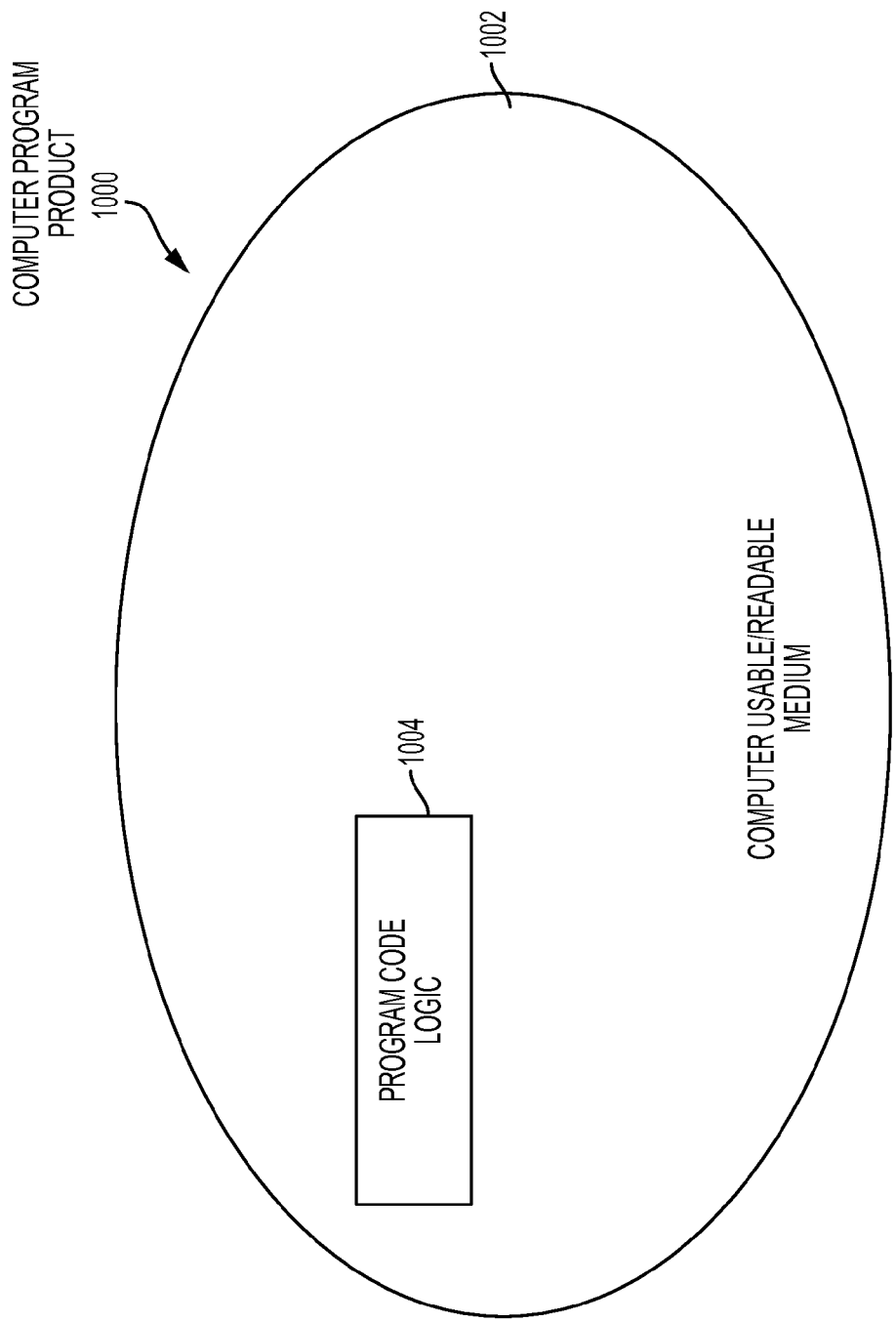
FIG. 10 depicts a computer program product in accordance with one or more embodiments.

Referring now to FIG. 10, a computer program product 1000 in accordance with an embodiment that includes a computer readable storage medium 1002 and program instructions 1004 is generally shown.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of wirelessly transferring electric power from a transmitter to a receiver, the transmitter having at least one transmitter processor circuit and at least one transmitter antenna circuit, the method comprising:
   converting, using the at least one transmitter processor circuit, an electric power signal to an electromagnetic field (EMF);
   associating, using the at least one transmitter processor circuit, each of a plurality of keys with one of a plurality of operating frequencies, and storing the plurality of keys associated with the plurality of operating frequencies in a table;
   selecting, using the at least one transmitter processor circuit, one of the plurality of operating frequencies stored in the table as an active operating frequency, wherein the active operating frequency is assigned as the current operating frequency of the transmitter antenna circuit, and wherein the key associated with the active operating frequency is assigned as an active key;

wirelessly transmitting to the receiver, using the at least one transmitter antenna circuit, the EMF at the active operating frequency; and wirelessly transmitting to the receiver, using the at least one transmitter antenna circuit, the table and an identification of the active key.

2. The method of claim 1, further comprising varying, using the at least one transmitter processor circuit, the active operating frequency and the active key randomly over time.

3. The method of claim 1, wherein:
the active key comprise an active digital key; and
the active digital key is modulated onto the EMF prior to wirelessly transmitting the EMF at the active operating frequency.

4. The method of claim 1, wherein the active key comprises an active time range key.

5. The method of claim 1 further comprising:
wirelessly transmitting, using the at least one transmitter antenna circuit, a password to the receiver;
wherein the password allows a predetermined level of service for the receiver.

6. The method of claim 1, wherein the predetermined level of service comprises a predetermined period of time during which the password is valid.

7. The method of claim 1 further comprising:
transmitting to the receiver, using the at least one transmitter antenna circuit, a set of application program instructions readable by at least one receiver processor circuit to cause the at least one receiver processor circuit to perform an application program method comprising:

identifying an entry in the table containing the active key;
identifying, based at least in part on the active key, an entry in the table corresponding to the active operating frequency associated with the active key; and
tuning at least one receiver antenna circuit to the active operating frequency.

* * * * *